UNITED STATES PATENT OFFICE.

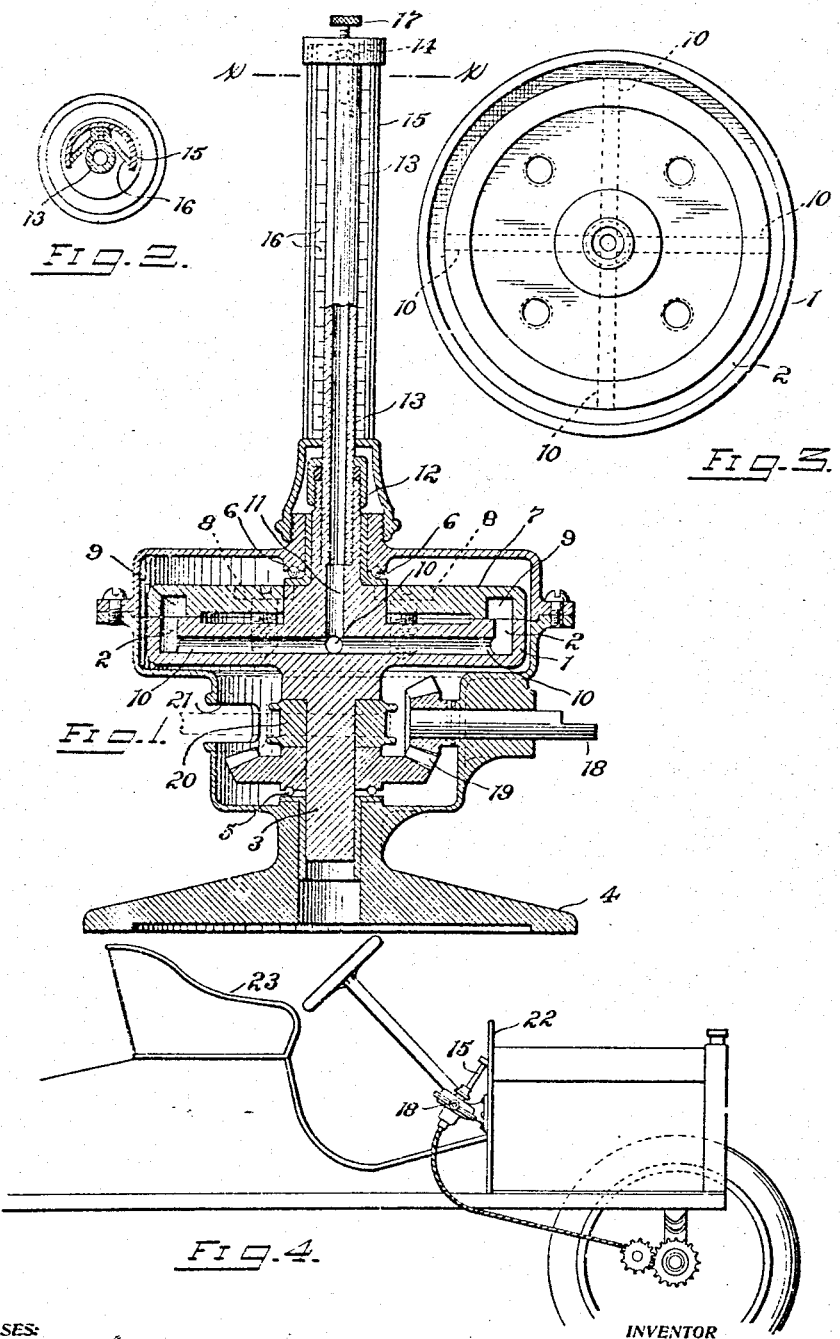

VINCENT LINK, OF DETROIT, MICHIGAN.

SPEED-INDICATOR.

No. 917,322.  Specification of Letters Patent.  Patented April 6, 1909.

Application filed June 17, 1908. Serial No. 438,884.

*To all whom it may concern:*

Be it known that I, VINCENT LINK, a citizen of the United States of America, residing at Detroit, in the county of Wayne and State of Michigan, have invented certain new and useful Improvements in Speed-Indicators, of which the following is a specification, reference being had therein to the accompanying drawings.

This invention relates to a speed indicator and more especially to that class wherein rotary motion causes displacement of liquid, the variations in the level thereof indicating the speed of rotation or the revolutions.

The object of the invention is to provide simple, accurate and readily adjustable means for indicating rotary speed which is adaptable as a tachometer for automobiles or the like and is likewise sufficiently sensitive for use in laboratories or test rooms.

The invention consists in the matters hereinafter set forth, and more particularly pointed out in the appended claims.

In the drawings, Figure 1 is a view in longitudinal section of an indicator embodying features of the invention. Fig. 2 is a view in section on line x—x of Fig. 1. Fig. 3 is a view in detail of a reservoir disk with cap removed. Fig. 4 is a view showing an adaptation of the indicator for use as a tachometer on an automobile.

As shown herein in preferred form, a disk 1 with an annular channel 2 in its upper face is journaled by an axial spindle or stem 3, on which it is integrally formed or otherwise suitably secured, in a stand 4, friction reducing bearings of any well-known type as indicated at 5 and 6 being provided. A cap 7 centered by the stem, is secured on the upper face of the disk, as by screws 8, and has an annular groove 9 on its underside adapted to register with the channel 2, its inner diameter being somewhat less than the inner diameter of the channel. The annular reservoir or compression chamber thus formed is connected by radial passages 10 with an axial duct 11 in the upper part of the stem which is counterbored and provided with any proper packing gland connections 12 for a transparent gage glass tube 13, whose upper free end has a stopper with capillary opening 14, the duct and gage glass forming a reservoir for the compression chamber.

A cylindrical guard 15 with view hole therein, incloses the gage glass and a graduated scale 16 behind the glass, preferably V-shaped as shown may be longitudinally adjusted in the guard by a suitably disposed thumb-screw 17. The spindle may be driven from the body whose rotations are to be indicated by any suitable transmission mechanism as for example, either a counter-shaft 18 and bevel gear 19, a pulley 20 with belt passing through an aperture 21 in the casing, or a direct coupling through the casing base, the casing itself enveloping the running parts as a shield.

In operation, the disk channel and passages are first filled full of mercury and the cap then applied and made fast, thereby trapping air in the annular compression chamber over the mercury. The gage glass is secured in place and mercury added until the zero point of the scale is approached, final adjustment being made by the scale-thumb-screw. Thereafter, rotation of the disk throws the mercury out into the annular compression chamber, up the outer wall thereof and compresses the air, the consequent dropping of the mercury in the gage glass past the scale showing the rate of revolution. The indicator may be inclined without preventing its proper operation, and in such case the casing is adapted to be secured as shown in Fig. 4 on the dash 22 of an automobile so that it is substantially perpendicular to the line of sight of a person sitting in the vehicle seat 23 and therefore easily read.

A feature of the invention is the arrangement of the compression chamber and feed passages which holds the mercury so distributed that the indicator may be used in a tilted position. Furthermore as the compression of the air by the mercury prevents the latter ever reaching a point where it will not move farther out into the chamber as the speed increases, the practical range of the instrument is very wide, and by varying the proportions of the compression chamber, any degree of sensitiveness of the instrument may be readily obtained, the larger the body of air to be compressed, the greater the change in the column level for each variation in speed.

Obviously changes may be made in the details of construction without departing from the spirit of the invention, and I do not care to limit myself to any particular form or arrangement of parts.

What I claim as my invention is:—

1. A speed indicator comprising a rotatable body containing an annular compression chamber having an upper air retaining space of greater cross-section than the lower liquid retaining channel and having an axially disposed reservoir and radial passages connecting the lower part of the chamber, and means for supporting and rotating the body.

2. A speed indicator comprising a casing, an upright spindle rotatably secured therein, a disk thereon having an annular compression chamber concentric with the spindle, and having also radial passages therefrom, a gage glass on the spindle in communication with the chamber through said radial passages, and driving means for the spindle.

3. A speed indicator comprising a casing, an upright hollow spindle journaled therein, a disk thereon having an annular channel in its upper face concentric with the spindle and having also radial passages connecting the channel and spindle bore, a cap on the disk having an annular groove on its underface in register with the channel, and means for driving the spindle.

4. A speed indicator comprising a casing, an upright hollow spindle journaled therein, a disk thereon having an annular channel in its upper face conc... ...spindle and having also radial passages connecting the channel and spindle bore, a cap on the disk having an annular groove on its underface in register with the channel, a gage glass secured on the upper end of the spindle, a guard enveloping the gage, a scale in the guard behind the gage, a thumb-screw adapted to shift the scale longitudinally.

5. A speed indicator comprising a casing, an upright hollow spindle journaled therein, a disk integrally formed thereon having an annular channel in its upper face concentric with the spindle and having also radial passages connecting the channel and spindle bore, a cap on the disk having an annular groove on its underface having an internal diameter less than the channel diameter and in register with the channel, and means for driving the spindle.

In testimony whereof I affix my signature in presence of two witnesses.

VINCENT LINK.

Witnesses:
C. R. STICKNEY,
A M DORR.